United States Patent [19]

Côté et al.

[11] Patent Number: 5,107,912

[45] Date of Patent: Apr. 28, 1992

[54] TREE PROCESSING APPARATUS

[76] Inventors: Jean-Marie Côté, 14828 Labelle, Pierrefonds, Quebec, Canada, H9H 1J3; Alain Bellefeuille, 3195 Marie-Rivier, #1, St-Hyacinthe, Quebec, Canada, J2S 8M6

[21] Appl. No.: 702,426

[22] Filed: May 20, 1991

[30] Foreign Application Priority Data

Dec. 15, 1990 [CA] Canada .................... 2029958

[51] Int. Cl.$^5$ ............................................. A01G 23/08
[52] U.S. Cl. .................................... 144/338; 144/2 Z; 144/3 D
[58] Field of Search ............... 144/2 Z, 3 D, 34 R, 144/34 E, 335, 336, 338

[56] References Cited

U.S. PATENT DOCUMENTS 3,542,099 11/1970 Gibson et al.
3,882,910 5/1975 Peltola et al.
3,905,407 9/1975 Guy et al. ............................ 144/338

FOREIGN PATENT DOCUMENTS 1142062 3/1983 Canada .

*Primary Examiner*—W. Donald Bray

[57] ABSTRACT

Tree processing apparatus having a knuckle boom mounted at one end on a vehicle. A stick boom is pivotally mounted at one end onto the knuckle boom near its other end. The other end of the stick boom projects past the other end of the knuckle boom and a tree processing head is suspended from the other end of the stick boom. The stick boom can be pivoted up from the knuckle boom raising the processing head above the other end of the knuckle boom and thereby permitting the other end of the knuckle boom to be planted on the ground to allow the knuckle boom to act as a lever to help free the vehicle if it becomes stuck.

The vehicle carries a tubular member for passively supporting the butt end portion of a tree to be processed by the processing head.

18 Claims, 3 Drawing Sheets

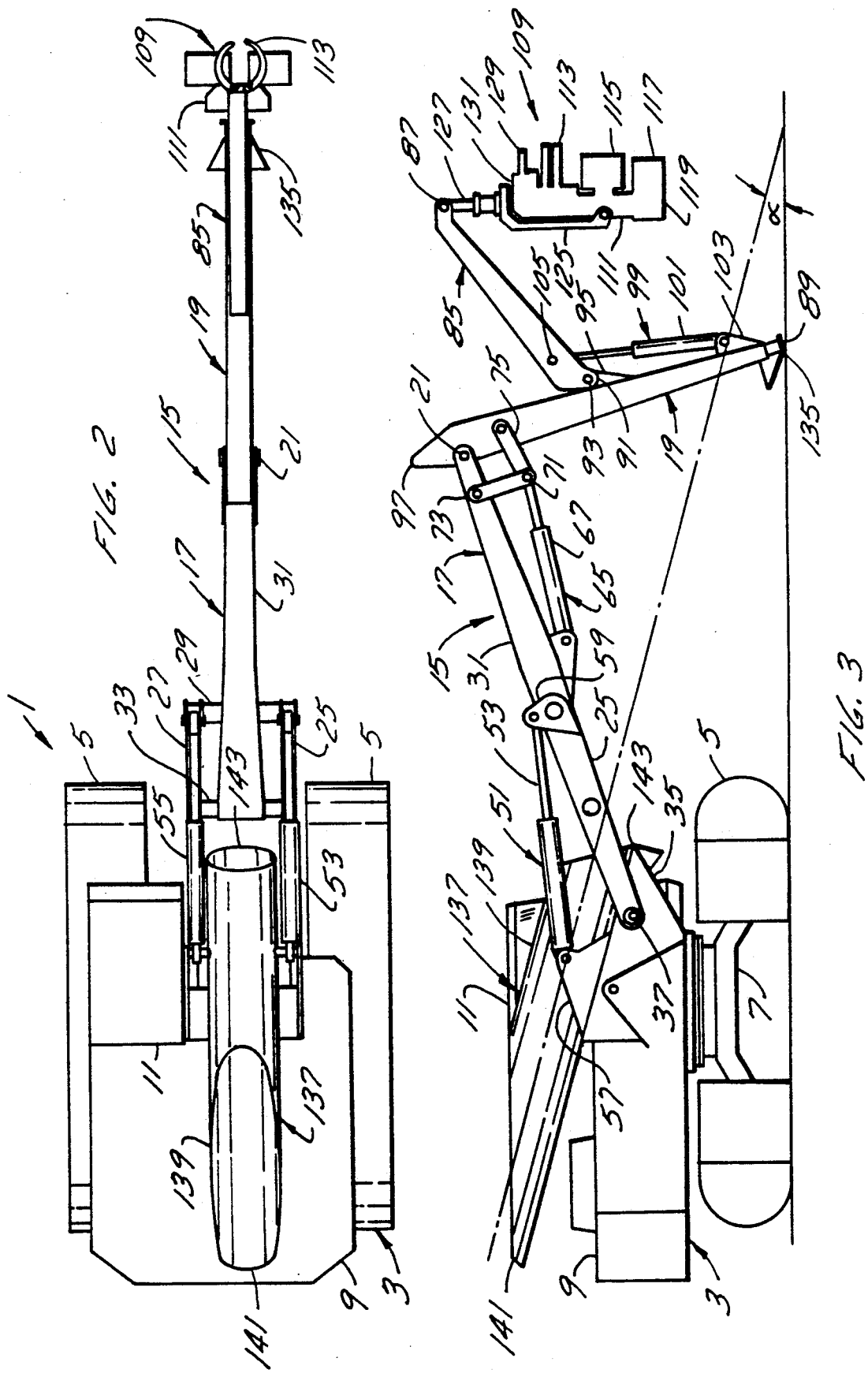

TREE PROCESSING APPARATUS

BACKGROUND OF THE INVENTION

1. Field of the Invention

This invention is directed toward an improved tree processing apparatus.

The invention is also directed toward an improved method of processing tress.

The invention is more particularly directed toward an improved tree processing apparatus of the type having a tree processing head mounted at the end of a boom which boom is mounted on a vehicle. In one embodiment of the invention, the improvement comprises providing a unique mounting for the tree processing head boom. In another embodiment of the invention the improvement comprises providing passive support means on the vehicle for the tree being processed. The tree rests both on the vechicle and the ground during most of the processing process thereby minimizing stress in the apparatus. In the preferred embodiment of the invention the unique mounting for the tree processing head is combined with the passive tree support means on the vehicle.

The invention is also more particularly directed toward an improved method of processing trees using a boom with a tree processing head at is end. In the improved method, the tree can be selectively processed full length or bucked.

2. Description of t he Prior Art

Tree processing apparatus employing a tree processing head suspended at the end of a knuckle boom is known. The tree processing heads are quite compact and usually carry tree feeling means, tree delimbing means, and tree feed means which are usually in the form of rollers. The knuckle boom positions the processing head adjacent the base of a tree to be felled. The tree is grabbed by the delimber arms, which also act as grapple arms, and while the tree is held, it is cut through with the felling means. The felled tree is then loosely held in a generally horizontal position by the delimbing arms on the processing head and the feed means are operated to feed the tree past the arms delimbing the tree.

This known apparatus is quite compact and energy efficient. It is especially suited for selective harvesting in forests, particularly in thinning operations. However the unit has some deficiencies. Usually about half the weight of the felled tree being processed is carried by the processing head while the top portion of the tree rests on the ground. A relatively strong and therefore heavy knuckle boom is required to support this weight. Also, the knuckle boom requires an additional heel boom near its outer end to help manoeuvre the vehicle in case it becomes stuck. The outer end of the knuckle boom itself cannot be used to help manoeuvre a stuck vehicle because the processing head is suspended from it. The addition of the heel boom further increases the overall weight of the apparatus making it more costly and less energy efficient.

SUMMARY OF THE INVENTION

It is the purpose of the present invention to provide an improved tree processing apparatus of the type incorporating a suspended processing head at the end of the boom that is lighter in weight and more energy efficient than known apparatus. In one embodiment of the invention, the apparatus is provided with passive support means on the vehicle for supporting one end of the tree being processed. With the other end of the tree being supported on the ground, there is little weight for the knuckle boom to normally carry, over and above the weight of the processing head, while the processing head moves the tree through itself to delimb it. Thus the knuckle boom can be more efficiently designed, reducing its weight, and making the machine more energy efficient. Preferably, the passive support comprises a tubular member that prevents lateral movement of the tree while it is support by its butt end. The tubular member is also preferably sloped downwardly at a slight angle so as to contact a longer portion of the tree thereby distributing the weight of the tree more evenly over the vehicle.

In another embodiment of the invention the processing head is mounted on the end of a stick boom which in turn is mounted on the outer portion of a knuckle boom. More specifically, the other or inner end of the stick boom is pivotally mounted on top of the knuckle boom and its one or outer end projects past the outer end of the knuckle boom. The stick boom normally rests on the outer end of the knuckle boom and carries the processing head and its outer end. When the outer end of the knuckle boom is needed for a ground brace to help move the vehicle when it is stuck, the stick boom can be raised away from the outer end of the knuckle boom, lifting the processing head at the outer end of the stick boom well above the outer end of the knuckle boom. Thus the raised processing head is out of the way when the outer end of the knuckle boom is planted firmly on the ground to allow the knuckle boom to act as a brace against which the stuck vehicle can be moved to help free it. The stick bbom required to support the processing head is much lighter in weight than a heel boom thereby reducing the overall weight of the apparatus and making it more energy efficient.

The method of processing trees with the improved apparatus is also novel. A felled tree is positioned to be supported by both the vehicle at one end by the ground at the other end. While so supported, the processing head can easily move the tree to delimb it. The delimbed tree can be stacked with other delimbed trees for further processing by other equipment. Alternatively the delimbed tree can be bucked by the processing head into shorter tree lengths.

The invention is particularly directed toward a tree processing apparatus having a boom with an inner end and an outer end and means for use in connecting the inner end of the boom to a vehicle. The apparatus includes a tree processing head, support means for normally suspending the tree processing head from the boom, and means for raising the tree processing head above the outer end of the boom.

The invention is also particularly directed toward a tree processing apparatus having a vehicle and a knuckle boom having an inner end and an outer end with means for mounting the knuckle boom at its inner end on the vehicle. A tree processing head is mounted on the knuckle boom. Passive support means are provided on the vehicle for supporting the bult end portion of a felled tree while the top portion of the tree rests on the ground. The supported tree is processed by the processing head.

The invention is further directed toward a method of processing trees using a tree processing apparatus having a vehicle, a boom mounted on the vehicle, and a tree processing head mounted on the boom. The method comprises the steps of operating the processing head to fell a tree, operating the processing head to move the felled tree so its butt end portion is passively supported by the vehicle while its top portion rests on the ground, and then operating the processing head to delimb the supported tree.

BRIEF DESCRIPTION OF THE DRAWINGS

FIG. 2 is a top view;

FIG. 3 is a side view showing the boom in the apparatus acting to brace the vehicle.

DESCRIPTION OF THE PREFERRED EMBODIMENTS

Figure 1:
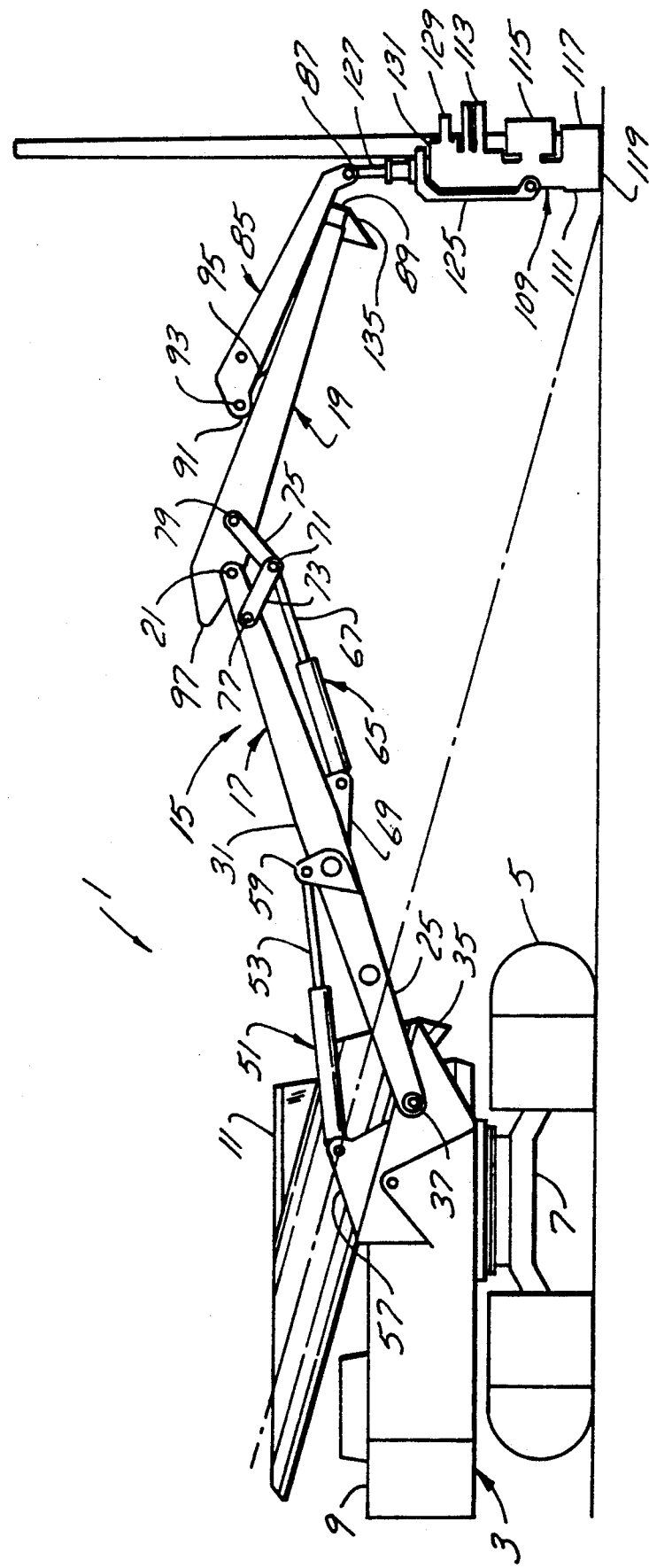
FIG. 1 is a side view of the improved tree processing apparatus.

The tree processing apparatus 1 as shown in FIGS. 1 and 2 includes a vehicle 3. The vehicle 3 can be a tracked vehicle having tracks 5 mounted on a frame 7 with the main body 9 of the vehicle, carrying the motor and hydraulic systems, rotatably mounted on the frame 7. A cab 11 is mounted on the side of the main body 9.

The apparatus 1 includes a boom 15 mounted on, and projecting from, the front of the body 9 of the vehicle. The boom 15 preferably is of the knuckle boom type having an inner boom part 17 and an outer boom part 19. A pivot 21 connects the inner and outer boom parts 17, 19 together. The free end of the inner boom part 17 is connected with pivot means to the front of the vehicle body 9 as will be described. Preferably the inner portion of the inner boom part 17 is divided into two parallel leg members 25, 27. The leg members 25, 27 extend rearwardly from a cross piece 29 which is connected at its middle to inner boom member 31. The inner boom member 31 extends part-way between leg members 25, 27 to a cross-member 33 that extends between leg members 25, 27. The free end of each leg member 25, 27 is connected to a bracket 35 on the vehicle body 9 by a pivot member 37.

Means 51 are provided for moving the knuckle boom 15 relative to the vehicle 3. These means 51 can comprise a pair of hydraulic acutators 53, 55, one for eeach leg member 25, 27. Each actuator 53, 55 is pivotally connected between a bracket 57 on the vehicle body 9 and a bracket 59 on the outer boom part 19 relative to the inner boom part 17. The moving means 65 can comprise a hydraulic actuator 67 pivotally connected at one end to a bracket 69 on the inner boom member 31. The other end of the hydraulic actuator 67 is pivotally connected via pivot 71 to the ends of the two links 73, 75. One link 73 is connected at its other end, via pivot 77, to the other boom member 31 near pivot 21. The other link 75 is connected at its other end, via pivot 79, to inner boom part 17 near pivot 21.

A stick boom 85 is mounted on the outer part of boom 15. More specifically, stick boom 85 is mounted on the top of the outer boom part 19 with its outer boom 85 is mounted on the top of the outer end 89 of the outer boom part 19. The inner end 91 of the stick boom 85 is pivotally connected, via a pivot 93, to a bracket 95 on the top of the outer boom part 19. The bracket 95 is positioned about mideway between the inner end 97 of the outer boom part 19 and its outer end 89. The stick boom 85 normally rests on the top of outer boom part 19 adjacent its outer end 89.

Means 99 are provided for pivoting the stick boom 85 about pivot 93 away from the outer end 89 of the outer boom part 19. These means 99, as shown in FIG. 3, can comprise a hydraulic actuator 101 pivotally connected between a bracket 103 on the outer boom part 19, near its outer end 89, and a pivot pin 105 on the stick boom 85 near pivot 93. The actuator 101 is normally strored within the stick boom 85 which has a channel shaped cross-section.

Figure 4:
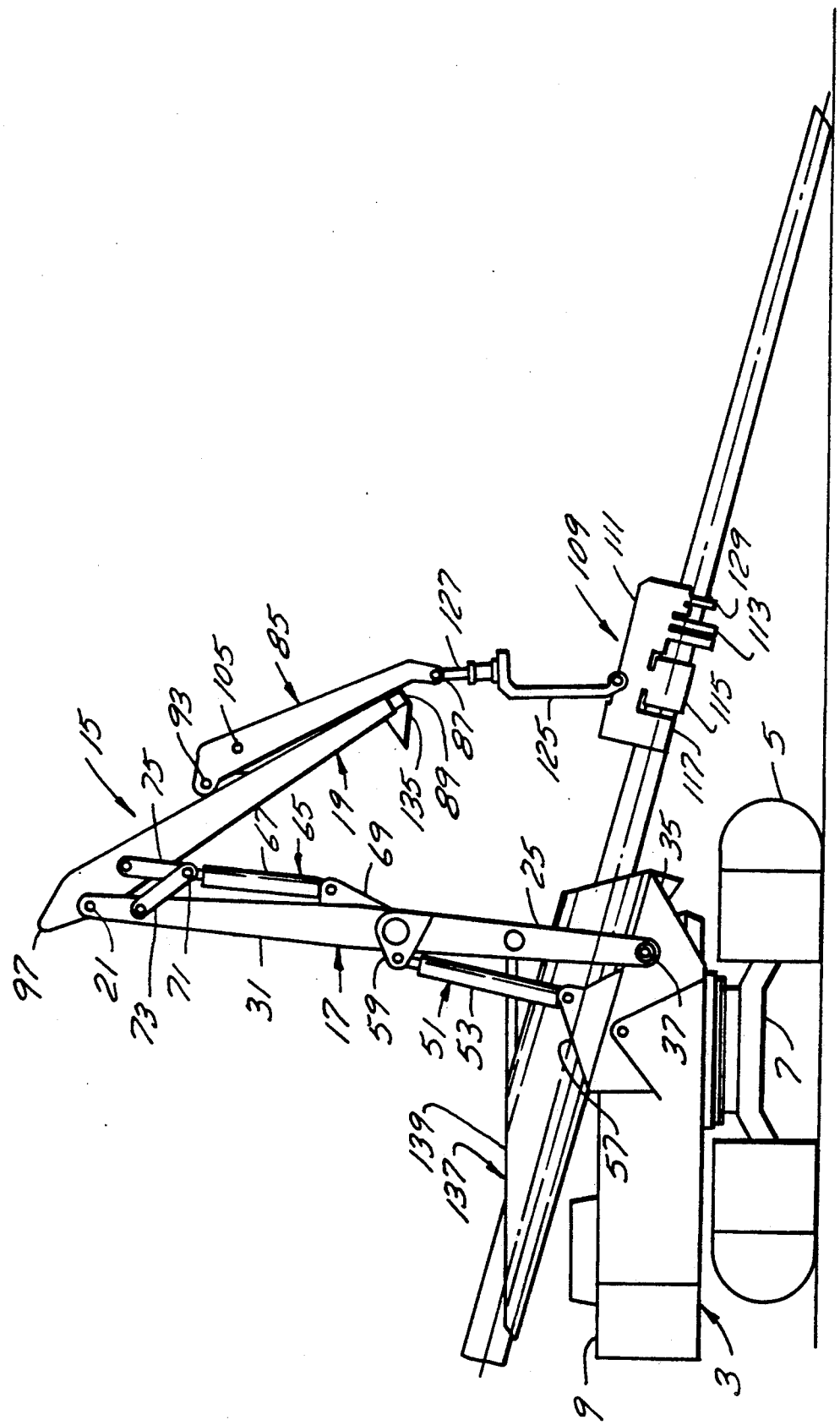
FIG. 4 is a side view showing the apparatus processing a tree.

Mounted on the front end 87 of the stick-boom 85 is a tree processing head 109. The tree processing head has a frame 111 carrying delimbing arms 113, feed means 115 and felling means 117. The felling means 117 are at the bottom end 119 of the frame 111. The frame 111 is pivotally connected to the end of a support arm 125. The frame 111 can be locked to the support arm 125 in an upright position as shown in FIG. 1 or released from the support arm 125 to pivot to a horizontal position as shown in FIG. 4. The support arm 125 is universally connected to the outer end 87 of the stick boom 85 with a universal connection 127. Preferably the tree processing head 109 includes a second cutting means 129 at the upper end 131 of the frame 111. The outer end 89 of the outer boom part 19 carries a ground engaging abutment plate 135.

The apparatus 1 includes means on the vehicle for passively supporting the butt end portion of a tree. By a passive support it is meant a support that has no moving parts and/or gripping means. The passive support means 137 can comprise a tubular member 139 mounted on vehicle body 9 with the tree resting on the bottom of the member and with the curved sides of the member preventing lateral movement and with the curved sides of the member preventing lateral movment of the tree. The tubular member139 slopes slightly downwardly from its back end 141 to its front end 143. The front of the tubular member 139 is located between the arms 25, 27 of the inner boom part 17 of the knuckle boom 15. The angle α at which the tubular member 141 is sloped is selected to have the majority of the trees being processed rest with their butt end portion generally flush on the bottom of member 139 over the length of the member. The angle α is normally around 15° for processing trees that are about sixty-five feet in length. The front portion of the trees rests on the ground. The two point support of the trees at their butt and top portions reduces the strength requirements of the knuckle boom since the boom need not support the trees during processing.

In operation of the apparatus, the knuckle boom 15 is extended and manoeuvred to place the processing head 109 in a position where its delimbing arms 113 can clamp onto a standing tree at its base. While clamped, the felling means 117 are operated to feel the tree. The knuckle boom 15 is manipulated, while the frame 111 of the processing head 109 is released from the support arm 125 to move the felled tree to a generally horizontal position, with the butt end of the tree in front of the tubular member 139. The feed rollers 115 on the processing head 109 can then be operated, while the delimber arms 113 relax slightly to support the tree without gripping it. The feed rollers 115 move the tree through the head 109 into the tubular member 141. Continued movement of the tree through the head 109 causes the delimber arms 113 to delimb the tree. During most of this movement the tree is supported at both ends by the tubular support 139 and the ground, thereby minimizing stress on the boom. When the top of the tree is reached during delimbing, movement of the fed rollers 115 is stopped and the second cutting means 129 on the head 109 is operated to top the delimbed tree. The processing head 109 is then moved toward the tubular support 139 and the feed rollers 115 are rotated in a reverse direction to pull the delimbed and topped tree back to a position where its center of gravity is under or close to being under the processing head 109. The rollers 115 are then stopped, the tree is gripped by the delimber arms 113, and by manoeuvring of the knuckle boom, the tree can be moved to a stack or pile of similarly processed trees. Alternatively, after the tree has been topped, the processing head 109 can be operated to move the tree back through the head, stopping every so often to operate the second cutting means 129 to buck the tree into suitable lengths.

During the felling, delimbing and bucking operations, the stick boom 85 rests on the outer end 89 of the knuckle boom 15, carrying the processing head 109 from its own outer end 87. At times during operation of the apparatus, the vehicle may become stuck in soft ground or muskeg. When this occurs, the knuckle boom is used as a brace to help the vehicle manoeuvre to become free. To use the knuckle boom 15 as a brace, the processing head 109 is moved out of the way by operation of the hydraulic actuator 99. The hydraulic actuator 99 pivots the stick boom 85 about pivot 93 thereby raising the processing head 109 above the outer end 89 of the outer part 19 of the knuckle boom 15. The outer end 89 of the knuckle boom 15 can now be planted on the ground via abutment plate 135 without damaging the processing head 109. Operation of the hydraulic actuator 67 on the knuckle boom while the end of the boom is planted on the ground will help move the vehicle aiding it in becoming free. Once the vehicle is free, the end 89 of the boom can be raised, and the stick boom 85 can be lowered to rest on top of the knuckle boom thereby placing the processing head 109 in an operating position.

It is contemplated in one variation of the invention that the apparatus can dispense with the stick boom. In this variation, the processing unit is directly, universally connected, to the end of the outer part of the knuckle boom. The ground abutment plate 135 is removed from the end 89 of the knuckle boom. Such an apparatus is useful in working in areas where the apparatus is not likely to become stuck. In another variation of the invention, the apparatus could dispense with any passive support means on the vehicle for the felled tree. The apparatus would still employ a knuckle boom, an attached stick boom, and the processing head universally connected to the projecting end of the stick boom. Such an apparatus would need a somewhat stronger knuckle boom to help carry part of the tree load. The apparatus could be used to harvest smaller trees with or without a strengthened knuckle boom.

We claim:

1. In a tree processing apparatus: a boom having an inner end and an outer end; means for use in connecting the inner end of the boom to a vehicle; a tree processing head; support means having an inner end and an outer end, the inner end of the support means pivotally connected to the boom inwardly of the outer end of the boom; means for normally suspending the tree processing head from the outer end of the support means below the outer end of the boom; and means for moving the support means to raise the tree processing head above the outer end of the boom.

2. In a tree processing apparatus as claimed in claim 1 wherein the raising means moves the support means relative to the boom.

3. In a tree processing apparatus as claimed in claim 1 including means on the vehicle for passively supporting the butt end portion of a felled tree.

4. In a tree processing apparatus as claimed in claim 3 wherein the passive support means comprises a tubular member having a front end and a rear end, the front end being lower than the rear end.

5. A tree processing apparatus having: a vehicle; a knuckle boom having an inner end and an outer end; means mounting the knuckle boom at its inner end on the vehicle; a tree processing head mounted on the knuckle boom, the tree processing head including means to move a tree to process it; and passive support means on the vehicle for supporting the butt end portion of a felled tree while the top portion of the tree rests on the ground, the supported tree being moved by the processing means to process it.

6. A tree processing apparatus as claimed in claim 5 wherein the passive support means comprises a tubular member having a front end and a rear end, the front end being lower than the rear end so that the tubular member slopes downwardly in the forward direction.

7. In a tree processing apparatus: a knuckle boom having an inner end and an outer end; means for use in pivotally connecting the inner end of the knuckle boom to a vehicle; means for manipulating the knuckle boom while on the vehicle; a stick boom having an inner end and an outer end; means for pivotally mounting the stick boom at its inner end on top of the knuckle boom with the outer end of the stick boom located past the outer end of the knuckle boom; means for pivoting the stick boom away from the knuckle boom; and a tree processing head suspended from the outer end of the stick boom.

8. A tree processing apparatus having: a vehicle; a knuckle boom having first and second boom parts pivotally connected together and inner and outer ends; means pivotally connecting the inner end of the knuckle boom to the vehicle; means connected between the first boom part and the vehicle for use in manipulating the knuckle boom; means connected between the first and second boom parts for use in manipulating the knuckle boom; a stick boom having an inner end and an outer end; means pivotally connecting the stick boom on top of the second boom part with its outer end located past the outer end of the knuckle boom; means for pivoting the stick boom away from the second boom part; and a tree processing head suspended from the outer end of the stick boom.

9. A tree processing apparatus as claimed in claim 8 wherein the stick boom normally rests on top of the second boom part at the outer end of the knuckle boom.

10. A tree processing apparatus as claimed in claim 8 wherein the outer end of the knuckle boom carries a ground contacting member.

11. A tree processing apparatus as claimed in claim 8 wherein the tree processing head has tree felling means, tree delimbing means, and tree feed means.

12. A tree processing apparatus as claimed in claim 11 wherein the tree processing head has the tree felling means at one end of the head, and tree topping means at the other end of the head.

13. A tree processing apparatus as claimed in claim 8 including means on the vehicle for passively supporting the butt end portion of a felled tree.

14. A tree processing apparatus as claimed in claim 13 wherein the passive support means comprises a tubular member having a front end and a rear end, the front end being lower than the rear end.

15. A tree processing apparatus as claimed in claim 14 wherein the inner end of the knuckle boom straddles the tubular member.

16. A method of processing trees using a tree processing apparatus having a vehicle, a boom mounted on the vehicle, and a tree processing head mounted on the boom; comprising the steps of: operating the processing head to fell a tree; operating the processing head to move the felled tree so its butt end portion is supported by the vehicle while its top portion rests on the ground; and then operating the processing head to delimb the supported tree.

17. A method as claimed in claim 16 including the step of cutting off the top of the tree with the processing head after delimbing.

18. A method as claimed in claim 16 including the step of cutting the delimbed tree into short tree lengths with the processing head.

* * * * *